(12) United States Patent
Yang

(10) Patent No.: US 10,939,344 B2
(45) Date of Patent: Mar. 2, 2021

(54) CELL HANDOVER METHOD, NETWORK NODE AND TERMINAL DEVICE

(71) Applicant: GUANGDONG OPPO MOBILE TELECOMMUNICATIONS CORP., LTD., Guangdong (CN)

(72) Inventor: Ning Yang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/886,490

(22) Filed: May 28, 2020

(65) Prior Publication Data

US 2020/0296645 A1    Sep. 17, 2020

Related U.S. Application Data

(63) Continuation of application No. PCT/CN2018/075692, filed on Feb. 7, 2018.

(51) Int. Cl.
| H04L 12/28 | (2006.01) |
| H04W 36/08 | (2009.01) |
| H04W 36/36 | (2009.01) |
| H04J 1/16  | (2006.01) |

(52) U.S. Cl.
CPC ........... *H04W 36/08* (2013.01); *H04W 36/36* (2013.01)

(58) Field of Classification Search
CPC .......................... H04W 36/08; H04W 72/0406
USPC ......................................... 370/252, 329, 331
See application file for complete search history.

(56) References Cited

U.S. PATENT DOCUMENTS

| 2007/0293224 | A1  | 12/2007 | Wang |
| 2008/0310349 | A1* | 12/2008 | Ulupinar ............. H04W 60/005 370/328 |
| 2013/0023269 | A1  | 1/2013  | Wang |
| 2014/0087734 | A1  | 3/2014  | Wang et al. |
| 2015/0319653 | A1  | 11/2015 | Wang et al. |
| 2017/0041841 | A1  | 2/2017  | Pedersen et al. |
| 2018/0084462 | A1* | 3/2018  | Xu ..................... H04W 36/0005 |
| 2018/0213457 | A1  | 7/2018  | Tang et al. |

(Continued)

FOREIGN PATENT DOCUMENTS

| CN | 101064943 A | 10/2007 |
| CN | 101888684 A | 11/2010 |

(Continued)

OTHER PUBLICATIONS

International Search Report in the international application No. PCT/CN2018/075692, dated Oct. 26, 2018.

(Continued)

*Primary Examiner* — John Pezzlo
(74) *Attorney, Agent, or Firm* — Perkins Coie LLP

(57) ABSTRACT

Provided are a cell handover method, a network node and a terminal device. The method includes that: a target node sends a first resource to a terminal device, the first resource being used for sending or receiving data after the terminal device is handed over to the target node. In implementation of the disclosure, the first resource is carried in a handover command or a handover acknowledgement, the terminal device can directly send or receive data on the first resource after the terminal device is handed over to the target node, thereby reducing a delay and improving user experience.

20 Claims, 9 Drawing Sheets

(56) References Cited

U.S. PATENT DOCUMENTS

2019/0021031 A1    1/2019  Pedersen et al.
2019/0327649 A1*  10/2019  Liu ..................... H04W 72/048
2020/0068624 A1*  2/2020  Xu ........................ H04W 28/02

FOREIGN PATENT DOCUMENTS

| CN | 103945471 A | 7/2014 |
|----|-------------|--------|
| CN | 107295658 A | 10/2017 |
| EP | 3340682 A1  | 6/2018 |
| WO | 2015127987 A1 | 9/2015 |
| WO | 2017049630 A1 | 3/2017 |

OTHER PUBLICATIONS

English translation of the Written Opinion of the International Search Authority in the international application No. PCT/CN2018/075692, dated Oct. 26, 2018.
"Control Plane Latency Reduction" 3GPP TSG-RAN WG2 #100 Tdoc R2-1713525 Reno, NV, USA, Nov. 27-Dec. 1, 2017.
"LTE Control Plane Latency Reduction" 3GPP TSG RAN WG2 # 100 R2-1713925 Reno, Nevada, USA, Nov. 27-Dec. 1, 2017.
Ericsson: "Enhanced Mobility Requirements", 3GPP Draft; R4-1609554 Further Mobility Enhancement RAN4 Requirements Discusison, 3RD Generation Partnership Project (3GPP), Mobile Competence Centre; 650, Route Des Lucioles; F-06921 Sophia-Antipol, vol. Ran WG4, No. Reno, USA; 20161114-20161118, Nov. 14, 2016 (Nov. 14, 2016), XP051179820, * section 2.1*.
Supplementary European Search Report in the European application No. 18905444.8, dated Oct. 14, 2020.

* cited by examiner

CELL HANDOVER METHOD, NETWORK NODE AND TERMINAL DEVICE

CROSS-REFERENCE TO RELATED APPLICATION

This application is a continuation of PCT/CN2018/075692 filed on Feb. 7, 2018, the entire contents of which are hereby incorporated by reference.

TECHNICAL FIELD

Implementations of the disclosure relate to the field of communication, and in particular to a cell handover method, a network node and a terminal device.

BACKGROUND

Mobility refers to the ability of a network to continuously provide communication services during the movement of mobile users or terminals within the coverage of the network. In the process, communication and service access of users can be not affected by changes in location and access technology and can be independent of changes in network service access points.

Mobility is beneficial for end users. Even when users are in high-speed motion, some services with low delay, such as voice and real-time video connection, can also be maintained. Mobility is also of great benefit to the services in nomadic movement. Even when the best service cell of two cells changes, a reliable connection can be maintained.

SUMMARY

A handover method, a network node and a terminal device are provided.

A first aspect provides a cell handover method, which may include that:

a terminal device receives a first resource and a second resource configured by a target node, the second resource being sent by the target node while sending the first resource; and the terminal device sends uplink traffic data via the first resource and a handover response via the second resource in response to that the terminal device is handed over to the target node.

A second aspect provides a terminal device, which may include a transceiver and a processor configured to trigger the transceiver to send and receive information.

The transceiver may be configured to receive a first resource and a second resource configured by a target node, wherein the second resource is sent by the target node while sending the first resource; and send uplink traffic data via the first resource and a handover response via the second resource in response to that the terminal device is handed over to the target node.

A third aspect provides a network node, which may include a transceiver and a processor configured to trigger the transceiver to send and receive information.

The transceiver may be configured to send a first resource and a second resource configured by a target node to a terminal device, the second resource being sent by the target node while sending the first resource.

The transceiver may be further configured to receive uplink traffic data via the first resource and a handover response via the second resource in response to that the terminal device is handed over to the target node.

DETAILED DESCRIPTION

The technical solutions in the implementations of the disclosure will be described below in combination with the drawings.

Figure 1:
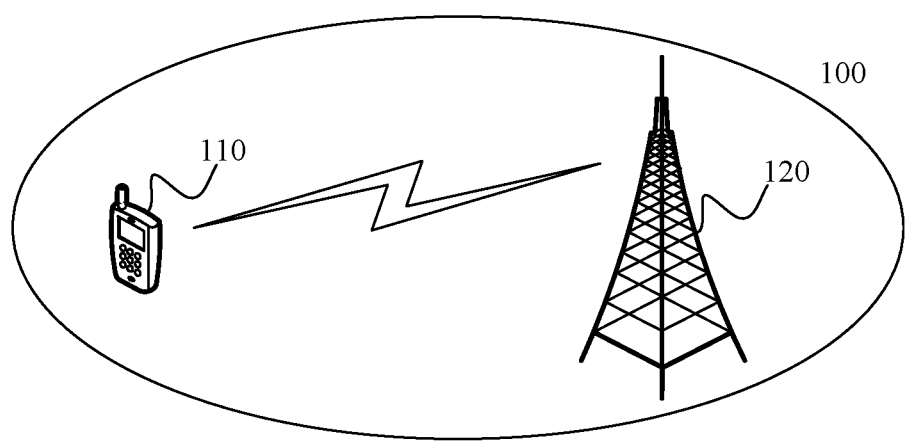
FIG. 1 is an example of an application scenario according to the disclosure.

FIG. 1 is a schematic diagram of an application scenario according to an implementation of the disclosure. As shown in FIG. 1, a communication system 100 may include a terminal device 110 and a network device 120. The network device 120 may communicate with the terminal device 110 through an air interface. Multi-service transmission is supported between the terminal device 110 and the network device 120.

It is to be understood that the implementations of the disclosure are described only with the communication system 100 as an example and the implementations of the disclosure are not limited thereto. That is, the technical solutions of the implementations of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, LTE Time Division Duplex (TDD), and a Universal Mobile Telecommunication System (UMTS).

In addition, each implementation of the disclosure is described in combination with the network device and the terminal device.

The network device 120 may be any entity, on a network side, configured to send or receive a signal. For example, the network device 120 may be Machine Type Communication (MTC) User Equipment (UE), a Base Transceiver Station (BTS) in the GSM or CDMA, a NodeB in WCDMA, an Evolution Node B (eNB or eNodeB) in LTE and a base station device in a 5th-Generation (5G) network.

The terminal device 110 may be any terminal device. Specifically, the terminal device 110 may communicate with one or more Core Networks (CNs) through a Radio Access Network (RAN), may also be called an access terminal, User Equipment (UE), a user unit, a user station, a mobile station, a mobile radio station, a remote station, a remote terminal, a mobile device, a user terminal, a terminal, a wireless communication device, a user agent or a user device, and for example, may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device and a terminal device in the 5G network.

Mobility in the LTE system generally includes mobility in an idle state and mobility in a connected state. The mobility in the idle state is mainly represented as cell selection and cell reselection. The mobility in the connected state is represented as handover. The mobility in the connected state is taken as an example here. The connected state here refers to a connected state of Evolved Packet System (EPS) Connection Management (ECM), namely an ECM-CONNECTED state. An ECM-CONNECTED state refers to whether a signaling connection between UE and a Mobility Management Entity (MME) is established. The mobility management in an LTE access system supports UE in the connected state to process all necessary steps involving relocation and handover of a core network node. These steps include handover determination of a source base station, resource preparation of a target base station (the target base station reserves required resources and then allocate them to UE after handover occurs), and also include commanding the UE to access a new wireless resource and eventually release the resource at the source base station. The process may further include sending context information between related nodes, forwarding user data between the related nodes, and updating a relationship between nodes of a user-plane and a control plane.

The handover under the connected state in an LTE system may be performed by network control and using UE as an assistance. There are two situations where an Evolved Packet Core Network (EPC) node is unchanged and the EPC node is relocated. A main difference between the two types of handover is that: whether a source evolved NodeB (eNB) and a target eNB in the handover can perform data interaction through an X2 interface. Handover in the same MME/Serving Gateway (SG) is taken for example here. An operation for a control plane does not involve a handover process during relocation of an EPC node, that is, the related handover preparation information is exchanged directly between the eNBs. A basic handover process not involving MME/SG change is shown in FIG. 1.

Steps related to the handover are as follows.

At 210, the source eNB sends downlink allocation to the target eNB.

Before the source eNB sends the downlink allocation to the target eNB, the target eNB may make a preparation for handover at L1/L2 layer, and the source eNB may receive a handover acknowledgement (ACK) message from the target eNB. The handover ACK message may include a handover command sent to the UE, an allocated new Cell Radio Network Temporary Identifier (C-RNTI), an algorithm identifier of a security algorithm selected at the target eNB, a possible dedicated Random Access Channel (RACH) preamble and some other possible parameters. The source eNB may allocate downlink resource for UE after receiving the handover ACK message.

At 220, the source eNB receives the handover command from the target eNB.

The target eNB may generate Radio Resource Control (RRC) information to perform handover, that is, RRC connection reconfiguration information containing Mobility Control Information (MCI) is sent by the source eNB to the UE. The source eNB may perform necessary integrity protection and encryption on the information. The UE may receive the RRC connection reconfiguration information which includes necessary parameters, for example, a new C-RNTI, a security algorithm identifier selected at the target eNB, an optional special preamble and a System Information Block (SIB) of the target eNB. The source eNB may control the handover.

At 230, the source eNB sends Serial Number (SN) status transfer information to the target eNB. The SN status transfer information is configured for avoiding retransmission of a correctly received Packet Data Convergence Protocol (PDCP) Service Data Unit (SDU) in lossless handover, and for requiring retransmission of a PDCP SDU which has been received correctly but is decompressed unsuccessfully.

At 240, the source eNB may forward data to the target eNB.

At 250, the UE performs synchronization.

After receiving the RRC connection reconfiguration information including mobility control information, the UE may perform synchronization directed to the target eNB and access a target cell through an RACH.

At 260, the target eNB responds to uplink allocation and Timing Advance (TA).

At 270, the UE sends a reconfiguration complete message to the target eNB. Specifically, after the UE successfully accesses the target cell, the UE sends a RRC connection reconfiguration complete message to confirm that the handover is completed, and the target eNB sends data to the UE immediately after the handover is completed.

It may be found that in a cell handover process, a handover delay is mainly reflected in the steps 220 to 270, and in the process, a terminal cannot perform uplink and downlink data transmission. It may be found from the delay of the handover process that some most important causes of delay in the handover process are screened out, as shown in the following table.

TABLE 1

Delay in the handover process

| Step | Descriptions | Time (ms) |
| --- | --- | --- |
| 220 | Handover command | 15 |
| 230 | SN status transfer | 0 |
| 250A | The target cell is searched | 0 |
| 250B | UE processing time for radio frequency/baseband retuning, and security update | 20 |
| 250C | A first available PRACH in the target eNB is acquired with a delay | 0.5/2.5 |
| 250D | A PRACH preamble is sent | 1 |
| 260 | The target eNB responds to the uplink allocation and the TA | 3/5 |
| 270 | The UE sends the reconfiguration complete message to the target eNB | 6 |
|  | The minimum/typical total delay | 45.5/49.5 |

It can be seen from Table 1 that there is a 15 ms delay in step 220, and step 250 (the UE performs the synchronization operation) may include step 250A (the target cell is searched), step 250B (UE processing time for radio frequency/baseband retuning, and security update), step 250C (the first available PRACH in the target eNB is acquired with a delay) and step 250D (the PRACH preamble is sent), which takes 21.5 ms/23.5 ms in total. There is a 3 ms/5 ms delay in step 260, and there is a 6 ms delay in step 270. In the handover process, the total consumed time is up to 45.5 ms/49.5 ms, which causes degraded user experience.

In the implementation of the disclosure, a Make Before Break (MBB) optimization may be performed for step 220, that is, the terminal may continue uplink and downlink data transmission when performing reconfiguration; a non-random access (RACHLess) optimization may be performed for step 250C, step 250D, step 260 and step 270, that is, the time for random access is saved, and furthermore, an uplink resource may be pre-allocated for sending a handover response (the reconfiguration complete message in step 270).

However, even so, the transmission of the handover response in step 270 takes time, that is, it takes one Transmission Time Interval (TTI) (in LTE) to send the handover response; in view of this, even an optimized handover process cannot meet the 0 ms-delay requirement. Therefore, an optimized method is further provided in the implementation of the disclosure, which can meet the 0ms-delay requirement during cell handover.

Figure 2:
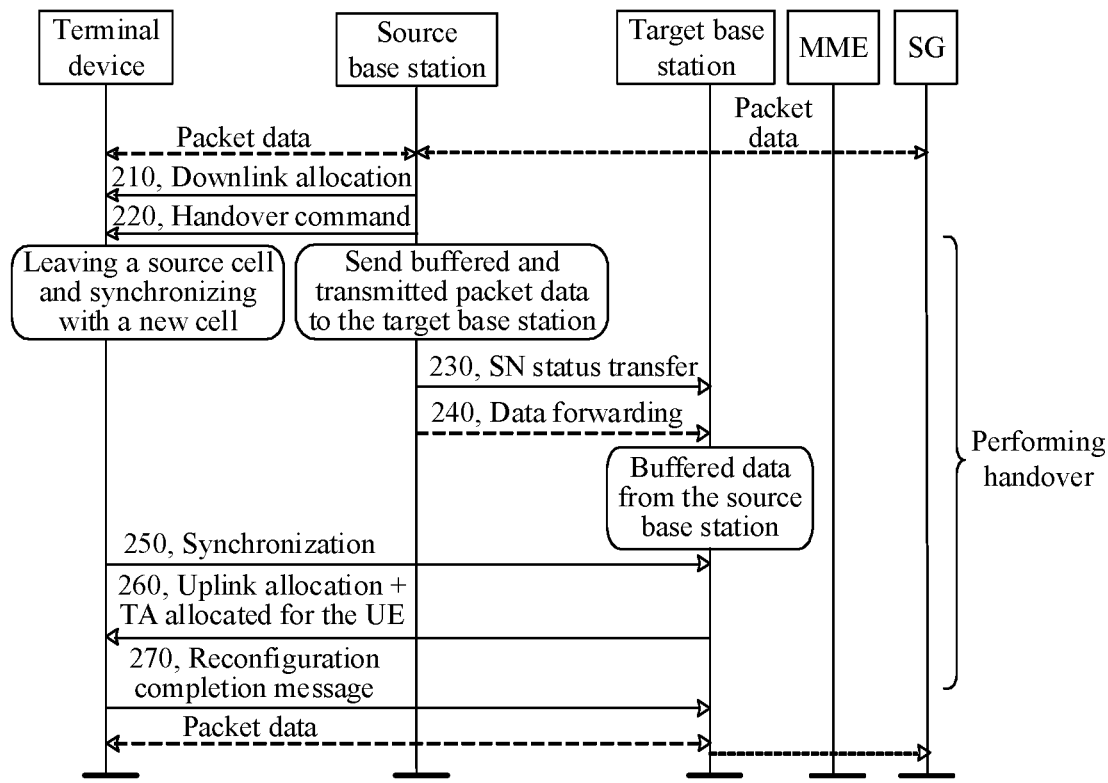
FIG. 2 is a schematic flowchart of a cell handover method according to an implementation of the disclosure.

It is to be understood that in the implementation shown in FIG. 2, further steps of the handover process may be included after step 270, which is not limited by the implementation of the disclosure. For example, the target eNB may send a path handover message to the MME to notify the UE that a serving cell is changed. The MME may send a user-plane update request to the SG to notify the SG that a connection of the user-plane needs to be handed over to the target eNB from the source eNB. The SG may switch a downlink data path to a target side, and release the resource of the user-plane of the source eNB. The SG may send a response to the user-plane update request to the MME to acknowledge the user-plane update request sent by the MME. The MME may send a path handover ACK message to the target eNB to confirm the path handover message. The target eNB may notify the source eNB of successful handover by sending UE context release information, and trigger resource release at the source eNB. Once receiving UE context release information from the target eNB, the source eNB may release the resource related to the UE. Furthermore, during handover, the user-plane may adopt the following principles to avoid data loss and support lossless handover. In a handover preparation stage, a user-plane data tunnel may be established between the source eNB and the target eNB. In a handover performing stage, user data may be forwarded from the source eNB to the target eNB. When the source eNB continuously receives packet data from the EPC, or a buffer of the source eNB is not cleared, forwarding of downlink user data from the source eNB to the target eNB may continue to be performed sequentially. In a handover completion stage, the target eNB may send the path handover message to the MME to inform the UE that access is allowed (the handover is completed), the MME may send the user-plane update request to the SG, and the EPC may switch a user-plane path from the source eNB to the target eNB.

In an actual operation, when the handover is started, a source system may forward downlink data received from a network to a target system. After the handover is completed, the target system may send the downlink data to the UE, so as to ensure that the downlink data sent by the network is not lost in the process that the UE terminates connection to the source system, performs synchronization, and then accesses the target system. Furthermore, for the handover under one MME, after the handover occurs, the source eNB may forward data to the target eNB through an X2 interface immediately after receiving a request.

Figure 3:
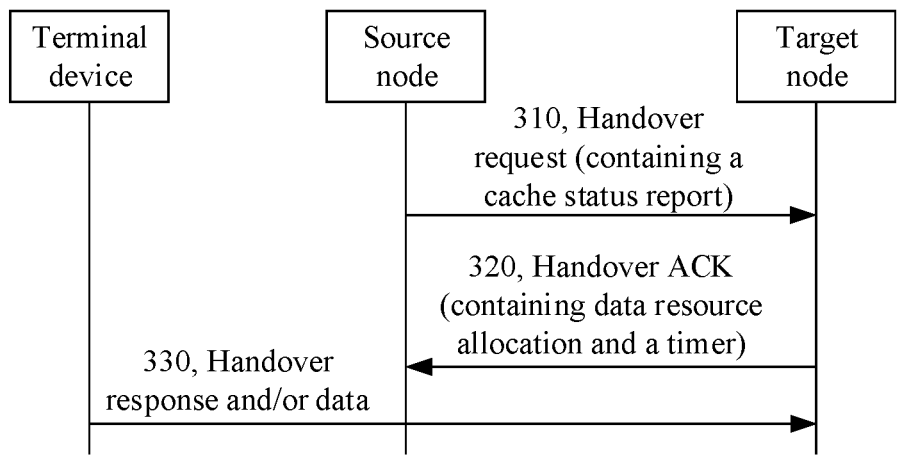
FIG. 3 is another schematic flowchart of a cell handover method according to an implementation of the disclosure.

FIG. 3 is another schematic flowchart of a cell handover method according to an implementation of the disclosure.

Specifically, as shown in FIG. 3, the cell handover method may include the following steps.

At 310, a source node sends a handover request to a target node; the handover request includes a cache status report.

At 320, the source node receives a handover ACK from the target node; the handover ACK may include data resource allocation information and a timer.

At 330, the terminal device sends a handover response and/or data to the target node.

Specifically, the target node may send a first resource to the terminal device. The first resource may be configured for sending or receiving data after the terminal device is handed over to the target node. It is to be understood that, the source node in the implementation may be the source base station as shown in FIG. 2, and the target node may be the target base station as shown in FIG. 2. The base station may be the network device as shown in FIG. 1.

In an implementation, the target node may send the first resource via the handover ACK. The handover ACK may be signaling sent by the target node to the source node. Specifically, the source eNB may receive the handover ACK from the target eNB, and the source node may generate a reconfiguration command or physical layer control signaling according to the handover ACK of the target node. The reconfiguration command or the physical layer control signaling may include the first resource. The terminal device may receive the first resource from the target node via the reconfiguration command or the physical layer control signaling. Furthermore, the handover ACK may also include a handover command sent to the UE, a new allocated Cell Radio Network Temporary Identifier (C-RNTI), an algorithm identifier of a security algorithm selected at the target eNB, a possible dedicated RACH preamble and some other possible parameters. After receiving the handover ACK, the source eNB may send the first resource in the handover ACK to the UE, that is, the target node sends the first resource to the terminal device via the handover ACK. In another implementation, the target node may send the first resource to the terminal device via the handover ACK. For example, the handover command sent to the UE in the handover ACK may include the first resource. Furthermore, before sending the first resource to the terminal device, the target node may also acquire data volume of the uplink data in a cache of the terminal device; then, the target node may allocate the first resource to the terminal device according to the data volume. In other implementation, the first resource may be an uplink resource predetermined by the terminal device and the network device, or pre-configured by the network, for example, the first resource may be the uplink resource pre-configured by the target node. In a specific implementation, the data volume may be reported to the source node by the terminal device, and then sent to the target node by the source node.

It is to be understood that in the implementation of the disclosure, the handover command or the handover ACK may be signaling sent by the target node to the source node. In other words, whether the UE is to be handed over may be decided by the source node. When determining that the UE is to be handed over, the source node may send a handover request message to the target node. The handover request message m to, X2 signaling context reference information of the UE at the source node, Si signaling context reference information of the UE at the EPC, an identity number of a target cell, an RRC-layer key (K node) during handover, an RRC context including a C-RNTI of the UE in the source node, access layer configuration and Media Access Control (MAC) configuration which may be applied to Radio Link Failure (RLF) recovery. Then, the target node may decide whether to allow the handover.

In an actual process, after receiving the handover command containing the first resource, the terminal device may perform a synchronization directed to the target node and access to the target node. In the implementation of the disclosure, the first resource may be carried in the handover command or the handover ACK, the terminal device can directly send or receive data on the first resource after the terminal device is handed over to the target node, thereby reducing a delay and improving user experience.

In at least one implementation, the target node may also manage the first resource.

In a specific implementation, the target node may also send configuration information of a timer corresponding to the first resource to the terminal device while sending the first resource to the terminal device. The timer may be configured for controlling the terminal device to send or receive data on the first resource before the timer expires. Thus, a radio resource can be effectively managed based on reduced delay. It is to be understood that the implementation takes that the first resource is managed by the timer as an example, and in other implementation, the target node may send information indicating the failure of the first resource to the terminal device.

In a cell handover process, after successfully accessing the target cell, the terminal device may also need to send the handover response (namely an RRC connection reconfiguration complete message) to the target node to confirm that the handover is completed, thus the target node may start to send data to the terminal device, or the target node may receive the data from the terminal device. In the implementation of the disclosure, the target node may also send the second resource to the terminal device while sending the first resource to the terminal device. The second resource may be configured for the terminal device to send the handover response to the target node. Thus, after successfully accessing the target cell, the terminal device may send the handover response to the terminal device on the second resource.

Figure 4:
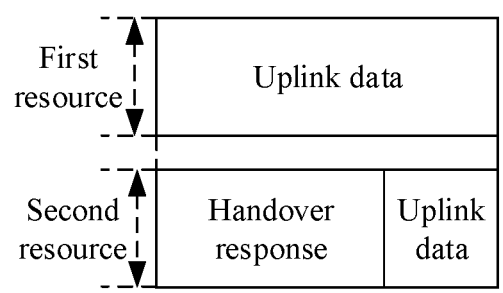
FIG. 4 is a schematic block diagram of a mode of sending uplink data and a handover response by a terminal device according to an implementation of the disclosure.
Figure 5:
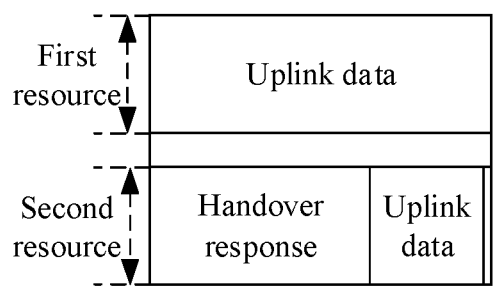
FIG. 5 is another schematic block diagram of a mode of sending uplink data and a handover response by a terminal device according to an implementation of the disclosure.

In the implementation of the disclosure, there may be resources left after the terminal device sends the handover response on the second resource, so the terminal device may also use the remaining resources to receive or send data, thereby improving resource utilization rate. FIG. 4 and FIG. 5 are schematic block diagrams of a mode of sending uplink data and a handover response by the terminal device according to an implementation of the disclosure. As shown in FIG. 4, the terminal device may send uplink data on remaining resources after sending the handover response on the second resource. As shown in FIG. 5, the terminal device may also send the handover response and the uplink data together on the second resource. That is, the optimized handover process can meet the 0ms-delay requirement by sending or receiving data in the handover response.

The implementation of the disclosure also provide a network node and a terminal device.

Figure 6:
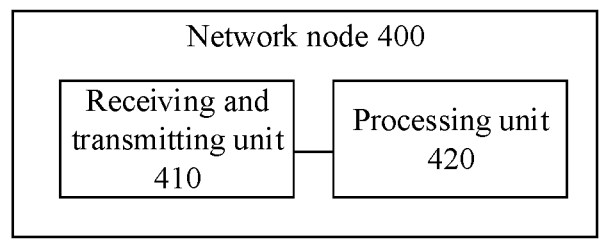
FIG. 6 is a schematic block diagram of a network node according to an implementation of the disclosure.

FIG. 6 is a schematic block diagram of a network node according to an implementation of the disclosure.

Specifically, as shown in FIG. 6, the network node 400 may include a receiving and sending unit 410.

The receiving and sending unit 410 is configured to send a first resource to a terminal device. The first resource may be configured for sending or receiving data after the terminal device is handed over to the network node.

In at least one implementation, the receiving and sending unit 410 may be specifically configured to:
send the first resource via a handover command; or
send the first resource through a handover ACK.

The handover ACK may be signaling sent by a target node to a source node and the handover command may be the signaling sent by the target node to the terminal device through the source node.

In at least one implementation, the receiving and sending unit 410 may be more specifically configured to:
send configuration information of a timer corresponding to the first resource to the terminal device while sending the first resource to the terminal device. The timer may be configured for controlling the terminal device to send or receive data on the first resource before the timer expires.

In at least one implementation, the receiving and sending unit 410 may be more specifically configured to:
send a second resource to the terminal device while sending the first resource to the terminal device. The second resource may be configured for the terminal device to send a handover response to the network node.

In at least one implementation, the receiving and sending unit 410 may be further configured to acquire data volume of uplink data in a cache of the terminal device before sending the first resource to the terminal device. The network node may further include a processing unit 420.

The processing unit 420 may be configured to allocate the first resource for the terminal device according to the data volume.

In at least one implementation, the receiving and sending unit 410 may be more specifically configured to:
send the first resource to the terminal device. The first resource may be an uplink resource predetermined by the terminal device and a network device, or pre-configured by a network.

Figure 7:
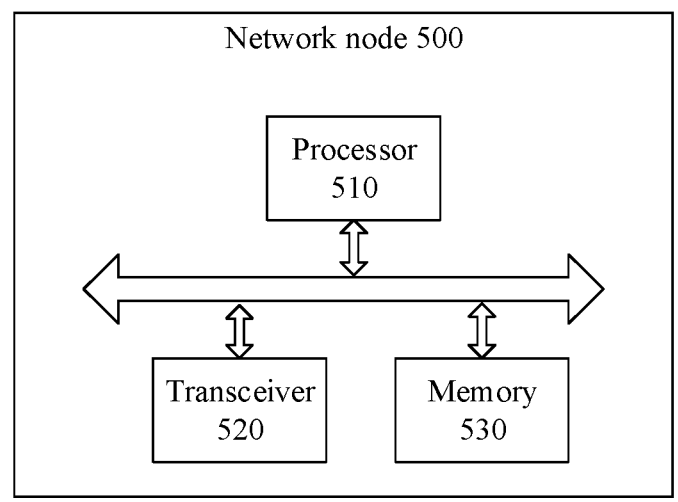
FIG. 7 is a schematic block diagram of another network node according to an implementation of the disclosure.

In the implementation of the disclosure, the receiving and sending unit 410 may be implemented by a transceiver and the processing unit 420 may be implemented by a processor. As shown in FIG. 7, the network node 500 may include a processor 510, a transceiver 520 and a memory 530. The memory 530 may be configured to store information, and may also be configured to store a code, instructions and the like executed by the processor 510. Each component in the network node 500 may be connected through a bus system. The bus system may include a data bus, and also include a power bus, a control bus and a state signal bus.

The network node 500 as shown in FIG. 7 may implement each process implemented by the network node in the method implementation of FIG. 2 or FIG. 3. For avoiding repetitions, elaborations are omitted herein.

Figure 8:
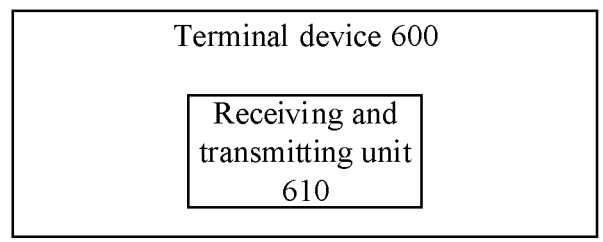
FIG. 8 is a schematic block diagram of a terminal device according to an implementation of the disclosure.

FIG. 8 is a schematic block diagram of a terminal device according to an implementation of the disclosure.

As shown in FIG. 8, the terminal device 600 may include a receiving and sending unit 610.

The receiving and sending unit 610 is configured to receive a first resource from a target node.

The receiving and sending unit 610 may be further configured to send or receive data on the first resource after the terminal device is handed over to the target node.

In at least one implementation, the receiving and sending unit 610 may be specifically configured to:
receive the first resource from the target node via a handover command; or
receive the first resource from the target node via a reconfiguration command or physical layer control signaling.

The handover command may be signaling forwarded by the target node through a source node. The reconfiguration command or the physical layer control signaling may be signaling generated by the source node according to a handover ACK of the target node.

In at least one implementation, the receiving and sending unit 610 may be specifically configured to:

receive configuration information of a timer corresponding to the first resource from the target node while receiving the first resource from the target node; and send or receive data on the first resource before the timer expires.

In at least one implementation, the receiving and sending unit 610 may be specifically configured to:

receive a second resource from the target node while receiving the first resource from the target node; and send a handover response to the target node on the second resource.

The first resource may be uplink resource allocated by the target node for the terminal device according to a data volume of the uplink data in a cache of the terminal device.

In at least one implementation, the first resource may be uplink resource predetermined by the terminal device and a network device, or pre-configured by a network.

Figure 9:
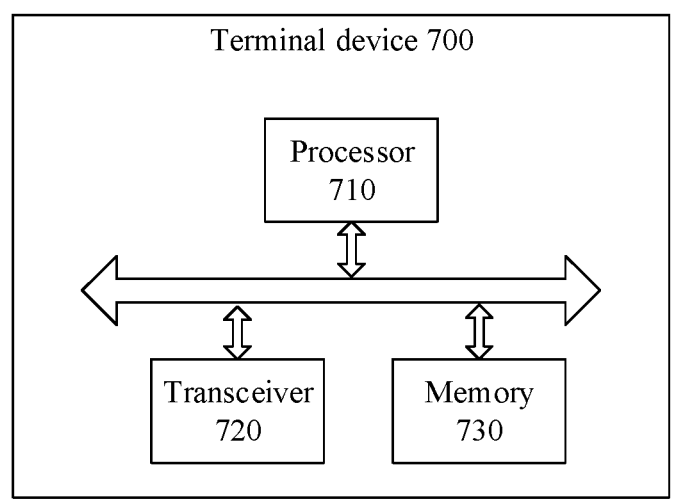
FIG. 9 is a schematic block diagram of another terminal device according to an implementation of the disclosure.

In the implementation of the disclosure, the receiving and sending unit 610 may be implemented by a transceiver. As shown in FIG. 9, the terminal device 700 may include a processor 710, a transceiver 720 and a memory 730. The memory 730 may be configured to store information, and may also be configured to store a code, instructions and the like executed by the processor 710. Each component in the terminal device 700 may be connected through a bus system. The bus system may include a data bus, and also include a power bus, a control bus and a state signal bus.

The terminal device 700 as shown in FIG. 9 may implement each process implemented by the terminal device in the method implementation of FIG. 2 or FIG. 3. For avoiding repetitions, elaborations are omitted herein.

In an implementation process, each step of the methods in the implementation of the disclosure may be completed by an integrated logical circuit of hardware in a processor or by instructions in a software form. More specifically, the steps of the methods provided in combination with the implementation of the disclosure may be directly embodied to be executed and completed by a hardware decoding processor or executed and completed by a combination of hardware and software modules in a decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium may be located in a memory, and the processor may read information in the memory, and complete the steps of the methods in combination with hardware.

The processor mentioned in the implementation of the disclosure may be an integrated circuit chip with a signal processing capability and may implement or execute each method, step and logical block diagram described in the implementation of the disclosure. For example, the processor may be a universal processor, a Digital Signal Processor (DSP), an Application Specific Integrated Circuit (ASIC), a Field Programmable Gate Array (FPGA) or other programmable logical devices, transistor logical devices and discrete hardware components. Moreover, the universal processor may be a microprocessor or the processor may also be any conventional processor and the like.

Moreover, the memory mentioned in the implementation of the disclosure may be a volatile memory or a nonvolatile memory, or may include both the volatile and nonvolatile memories. The nonvolatile memory may be an ROM, a PROM, an Erasable PROM (EPROM), an EEPROM or a flash memory. The volatile memory may be an RAM, and may be used as an external high-speed cache. It is to be understood that the memories above mentioned are exemplarily but unlimitedly described; for example, the memories in the implementation of the disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAIVI) and a Direct Rambus RAM (DR RAM). That is, the memory of a system and method described in the disclosure is intended to include, but not limited to, memories of these and any other proper types.

It is finally to be noted that terms used in the implementation and appended claims of the disclosure are only for the purpose of describing the specific implementation and not intended to limit the implementation of the disclosure.

For example, singular forms "a/an", "said" and "the" used in the implementation and appended claims of the disclosure are also intended to include plural forms unless other meanings are clearly expressed in the context. For another example, terms "the first resource" and "the second resource" may be adopted in the implementation of the disclosure, but these resources should not be limited to these terms. These terms are only adopted to distinguish the resources. For another example, based on the context, term "while" used here may be explained as "if" or "in case of" or "when" or "responsive to determining" or "responsive to detecting". Similarly, based on the context, phrase "if determining" or "if detecting (stated condition or event)" may be explained as "when determining" or "responsive to determining" or "when detecting (stated condition or event)" or "responsive to detecting (stated condition or event)".

Those of ordinary skill in the art may realize that the units and algorithm steps of each example described in combination with the implementation described in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the implementation of the disclosure.

Those skilled in the art may clearly learn about that specific working processes of the system, device and unit described above may refer to the corresponding processes in the method implementation and will not be elaborated herein for convenient and brief description.

In some implementations provided by the present application, it is to be understood that the described system, device and method may be implemented in other manners. For example, the device implementations described above are only schematic. For example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, namely, may be located in the same place or may be distributed to multiple network units. Part or all of the units may be selected to achieve the purpose of the implementations of the disclosure according to a practical requirement.

Moreover, all the function units in the implementations of the disclosure may be integrated in a processing unit; or the units may exist separately and physically; or two or more than two units may be integrated in a unit.

When realized in form of software functional unit and sold or used as an independent product, the function may also be stored in a computer-readable storage medium. Based on such an understanding, the technical solutions of the implementations of the disclosure substantially or parts making contributions to the conventional art or part of the technical solutions may be embodied in form of software product, and the computer software product may be stored in a storage medium, including multiple instructions configured to enable a computer device (which may be a personal computer, a server, a network device or the like) to execute all or part of the steps of the method in the implementations of the disclosure. The foregoing storage medium includes any medium that can store program code, such as a U disk, a removable hard disk, an ROM, an RAM, a magnetic disk, or an optical disc.

The above are only the implementation modes of the implementations of the disclosure and not intended to limit the scope of protection of the implementations of the disclosure. Any variations or replacements apparent to those skilled in the art within the technical scope described by the implementations of the disclosure shall fall within the scope of protection of the implementations of the disclosure. Therefore, the scope of protection of the implementations of the disclosure shall be subject to the scope of protection of the claims.

The invention claimed is:

1. A handover method, comprising:
   receiving, by a terminal device, a first resource and a second resource configured by a target node, wherein the second resource is sent by the target node while sending the first resource; and
   sending, by the terminal device and directly to the target node, uplink traffic data via the first resource and a handover response via the second resource in response to that the terminal device is handed over to the target node.

2. The handover method of claim 1, wherein receiving, by the terminal device, the first resource and the second resource configured by the target node comprises:
   receiving, by the terminal device, the first resource and the second resource configured by the target node before the terminal device is handed over to the target node.

3. The handover method of claim 1, wherein receiving, by the terminal device, the first resource comprises:
   receiving, by the terminal device, the first resource from the target node via a handover command; or
   receiving, by the terminal device, the first resource from the target node via a reconfiguration command or physical layer control signaling;
   wherein the handover command is forwarded by the target node through a source node; the reconfiguration command or the physical layer control signaling is generated by the source node according to a handover acknowledgement (ACK) of the target node.

4. The handover method of claim 1, wherein receiving, by the terminal device, the first resource comprises:
   receiving, by the terminal device, configuration information of a timer corresponding to the first resource from the target node while receiving the first resource from the target node;
   the method further comprises:
   sending or receiving, by the terminal device, data on the first resource before the timer expires.

5. The handover method of claim 1, wherein the handover response is a radio resource control connection reconfiguration complete message.

6. The handover method of claim 1, the first resource is an uplink resource allocated by the target node for the terminal device according to a data volume of uplink data in a cache of the terminal device.

7. The handover method of claim 1, wherein the first resource is an uplink resource predetermined by the terminal device and a network device, or pre-configured by a network.

8. A terminal device, comprising:
   a transceiver, and
   a processor configured to trigger the transceiver to send and receive information;
   wherein the transceiver is configured to:
      receive a first resource and a second resource configured by a target node, wherein the second resource is sent by the target node while sending the first resource; and
      send, directly to the target node, uplink traffic data via the first resource and a handover response via the second resource in response to that the terminal device is handed over to the target node.

9. The terminal device of claim 8, wherein when receiving the first resource and the second resource configured by the target node, the transceiver is specifically configured to:
   receive the first resource and the second resource configured by the target node before the terminal device is handed over to the target node.

10. The terminal device of claim 8, wherein the transceiver is configured to:
    receive the first resource from the target node via a handover command; or
    receive the first resource from the target node via a reconfiguration command or physical layer control signaling;
    wherein the handover command is forwarded by the target node through a source node; the reconfiguration command or the physical layer control signaling is generated by the source node according to a handover acknowledgement (ACK) of the target node.

11. The terminal device of claim 8, wherein the transceiver is configured to:
    receive configuration information of a timer corresponding to the first resource from the target node while receiving the first resource from the target node; and
    send or receive data on the first resource before the timer expires.

12. The terminal device of claim 8, wherein the handover response is a radio resource control connection reconfiguration complete message.

13. The terminal device of claim 8, wherein the first resource is an uplink resource allocated by the target node for the terminal device according to a data volume of uplink data in a cache of the terminal device.

14. The terminal device of claim 8, wherein the first resource is an uplink resource predetermined by the terminal device and a network device, or pre-configured by a network.

15. A target node, comprising:
a transceiver, and
a processor configured to trigger the transceiver to send and receive information;
wherein the transceiver is configured to:
send a first resource and a second resource configured by the target node to a terminal device, wherein the second resource is sent by the target node while sending the first resource; and
receive uplink traffic data via the first resource and a handover response via the second resource directly from the terminal device in response to that the terminal device is handed over to the target node.

16. The target node of claim 15, wherein when sending the first resource and the second resource configured by the target node to the terminal device, the transceiver is specifically configured to:
send the first resource and the second resource configured by the target node before the terminal device is handed over to the target node.

17. The target node of claim 15, wherein the transceiver is configured to:
send the first resource via a handover command; or
send the first resource through a handover acknowledgement (ACK);
wherein the handover ACK is sent by the target node to a source node, and the handover command is sent by the target node to the terminal device through the source node.

18. The target node of claim 15, wherein the transceiver is configured to:
send configuration information of a timer corresponding to the first resource to the terminal device while sending the first resource to the terminal device, wherein the timer is configured to control the terminal device to send or receive data on the first resource before the timer expires.

19. The target node of claim 15, wherein the handover response is a radio resource control connection reconfiguration complete message.

20. The target node of claim 15, wherein
the second resource is configured for the terminal device to directly send the handover response to the target node.

* * * * *